United States Patent [19]

Wang et al.

[11] Patent Number: 5,119,441
[45] Date of Patent: Jun. 2, 1992

[54] OPTICAL CHARACTER RECOGNITION APPARATUS AND METHOD USING MASKS OPERATION

[75] Inventors: Wayne Wang, Cupertino; Alan Lin, Fremont, both of Calif.

[73] Assignees: Ricoh Company, Ltd., Tokyo, Japan; Ricoh Corporation, San Jose, Calif.

[21] Appl. No.: 329,671

[22] Filed: Mar. 28, 1989

[51] Int. Cl.⁵ .............................................. G06K 9/46
[52] U.S. Cl. ........................................ 382/37; 382/38; 382/16
[58] Field of Search ...................... 382/30, 34, 37, 38, 382/16, 18, 24, 33

[56] References Cited

U.S. PATENT DOCUMENTS

| | | |
|---|---|---|
| 3,723,970 | 3/1973 | Stoller . |
| 3,873,972 | 3/1975 | Levine . |
| 3,930,231 | 12/1975 | Hendrichon . |
| 3,969,700 | 7/1976 | Bollinger . |
| 4,003,025 | 1/1977 | Hilliard . |
| 4,034,343 | 7/1977 | Wilmer . |
| 4,075,605 | 2/1978 | Hilley . |
| 4,083,034 | 4/1978 | Hicks . |
| 4,097,847 | 6/1978 | Forsen . |
| 4,180,799 | 12/1979 | Smith . |
| 4,193,056 | 3/1980 | Morita . |
| 4,206,442 | 6/1980 | Miyazaki . |
| 4,251,799 | 2/1981 | Jih . |
| 4,376,932 | 3/1983 | Cassada . |
| 4,377,803 | 3/1983 | Lotspiech . |
| 4,379,282 | 4/1983 | Bailey . |
| 4,379,283 | 4/1983 | Ito . |
| 4,403,340 | 9/1983 | Kumpf . |
| 4,468,809 | 8/1984 | Grabowski . |
| 4,491,960 | 1/1985 | Brown .................................... 382/37 |
| 4,910,787 | 3/1990 | Umeda .................................... 382/18 |

OTHER PUBLICATIONS

L. K. McMains et al., "Character Recognition Technique" IBM Technical Disclosure Bulletin, vol. 15, No. 1, Jun. 1972, pp. 15–17.

*Primary Examiner*—David K. Moore
*Assistant Examiner*—Yon Jung
*Attorney, Agent, or Firm*—Flehr, Hohbach, Test, Albritton & Herbert

[57] ABSTRACT

An optical character recognition apparatus and method as a mask operation in conjunction with a decision tree process to provide fast recognition of multi-font alphanumeric characters on a document.

6 Claims, 18 Drawing Sheets

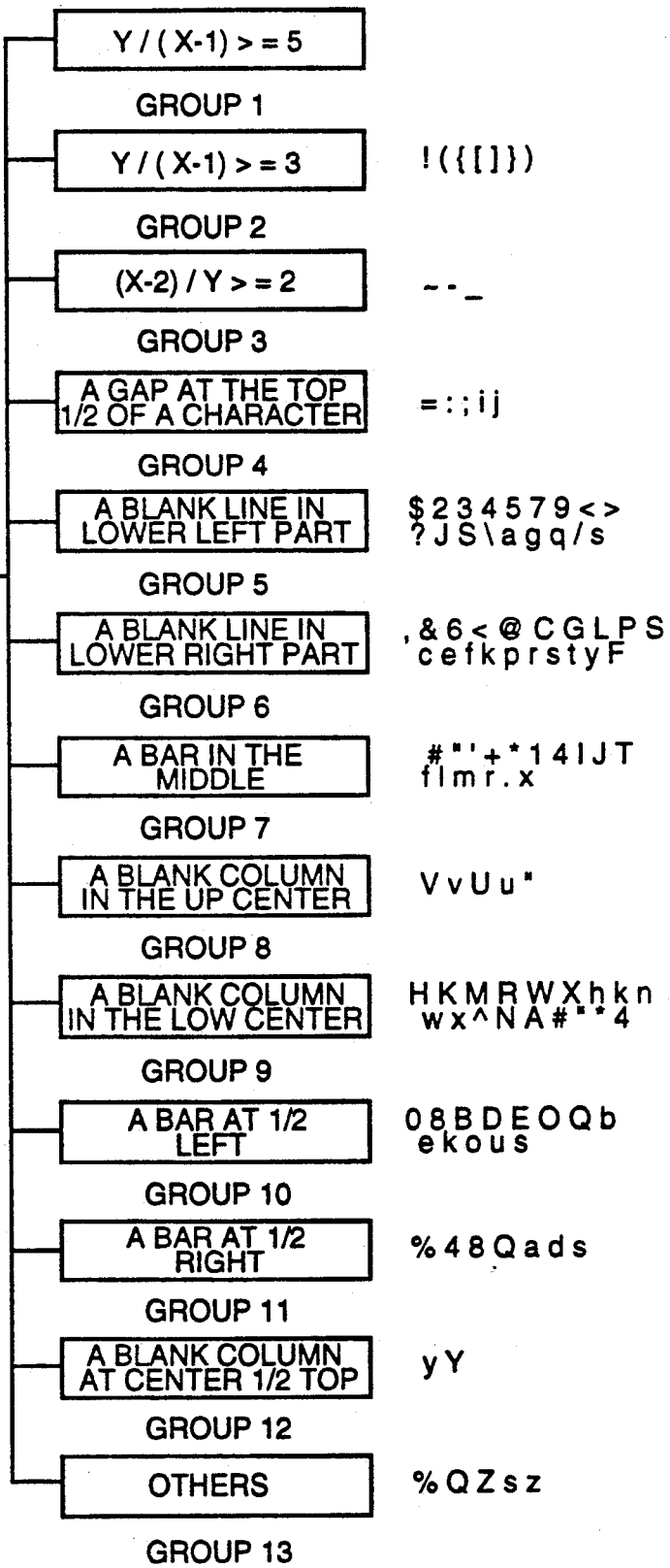

| | | |
|---|---|---|
| | Y / ( X-1 ) > = 5 | |
| | GROUP 1 | |
| | Y / ( X-1 ) > = 3 | ! ( { [ ] } ) |
| | GROUP 2 | |
| | ( X-2 ) / Y > = 2 | ~ - _ |
| | GROUP 3 | |
| | A GAP AT THE TOP 1/2 OF A CHARACTER | = : ; i j |
| | GROUP 4 | |
| | A BLANK LINE IN LOWER LEFT PART | $ 2 3 4 5 7 9 < > ? J S \ a g q / s |
| | GROUP 5 | |
| | A BLANK LINE IN LOWER RIGHT PART | , & 6 < @ C G L P S ' c e f k p r s t y F |
| | GROUP 6 | |
| | A BAR IN THE MIDDLE | # " ' + * 1 4 I J T f l m r . x |
| | GROUP 7 | |
| | A BLANK COLUMN IN THE UP CENTER | V v U u " |
| | GROUP 8 | |
| | A BLANK COLUMN IN THE LOW CENTER | H K M R W X h k n w x ^ N A # " * 4 |
| | GROUP 9 | |
| | A BAR AT 1/2 LEFT | 0 8 B D E O Q b e k o u s |
| | GROUP 10 | |
| | A BAR AT 1/2 RIGHT | % 4 8 Q a d s |
| | GROUP 11 | |
| | A BLANK COLUMN AT CENTER 1/2 TOP | y Y |
| | GROUP 12 | |
| | OTHERS | % Q Z s z |
| | GROUP 13 | |

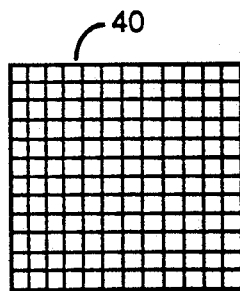

CHARACTER IN MATRIX

Y = Bitcount across the length
X = Bitcount across the width

FIGURE 3

OPTICAL CHARACTER RECOGNITION APPARATUS AND METHOD USING MASKS OPERATION

BACKGROUND OF THE INVENTION

The present invention relates to an image recognition apparatus and method, and more particularly to optical character recognition of digitally scanned images to convert digitally scanned raster images to character codes.

Optical character recognition (OCR) algorithms are generally grouped into two categories. One category is the pattern matching and the other category is the feature detection and analysis method. The pattern matching technique is well known and widely used for printed character recognition. On the other hand, the feature analysis method is applied for rather complicated character recognition like Kanji or hand written characters.

The pattern matching technique is simple and fast, but too sensitive to the noise in the image. To apply this technique for multifont character recognition, a large volume of dictionary pattern must be prepared. The pattern matching method is believed to be fast for its simplicity, particularly if the pattern dictionary is not so large. However, in applications where many characters with various kinds of fonts and symbols are utilized, the pattern matching technique is not a fast recognition algorithm. On the other hand, the feature detection technique needs much time to detect the feature parameters of each character.

SUMMARY OF THE INVENTION

It is an object of the present invention to provide an improved optical character recognition apparatus and method.

It is a more particular object to provide an improved optical character recognition apparatus and corresponding method which uses a mask operation to quickly and accurately provide recognition of alphanumeric characters on a document.

In one embodiment, the present invention includes means for scanning a document having one or more alphanumeric characters thereon to form scanned data representative of the alphanumeric characters.

The present invention further includes means for processing the scanned data in order to recognize the particular characters. The processing means includes means for evaluating any one of the characters within a matrix. The evaluation process further includes a multigroup decision tree where each group evaluation provides an indication of one or more particular types of characters. Each of the groups includes one or more subgroups to provide an indication on a decision tree basis of the particular character within the matrix.

Other objects, features and advantages of the present invention will become apparent from the following detailed description when taken in conjunction with the accompanying drawings.

DETAILED DESCRIPTION OF THE DRAWINGS

The present invention utilizes a mask matching technique to provide a simple and fast feature detection method. A dictionary search process follows after the feature detection process, which will be described below.

The present invention does not require a search for unrelated features in the dictionary (which utilizes a decision tree search). In the average, current approaches compare twenty dictionary patterns, but the present invention compares only about 3.5 patterns. The total speed is believed to be twice as fast as existing pattern matching methods. Only a mask operator need be used, and recognition is provided by a decision tree. The process is independent from feature detection.

Figure 1:
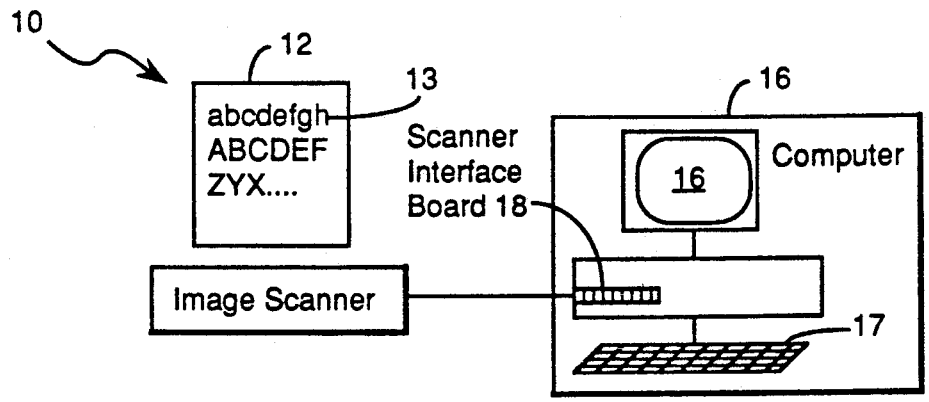
FIG. 1 depicts a block diagram of an optical character recognition system.

Referring now to FIG. 1, a block diagram of an optical character recognition system is depicted, in which an image scanner 12 scans a document 11 having one or more alphanumeric characters 13 printed thereon to form scanned data representative of the characters. The image scanner 12 could be a scanner manufactured by Ricoh Corporation, known as Model IS-30.

The output of scanner 12 is input on bus or lead 15 to a conventional personal computer (PC) 14 which includes a suitable scanner interface board 18, a display terminal 16 and a conventional keyboard 17. The PC 14 could be one manufactured by International Business Machines Corporation, known as the Model PC/AT.

According to the present invention, image data input can be from scanner 12 or, alternatively, from a suitable file for input to PC 14. The recognized characters are displayed on the PC screen 16.

Figure 2:
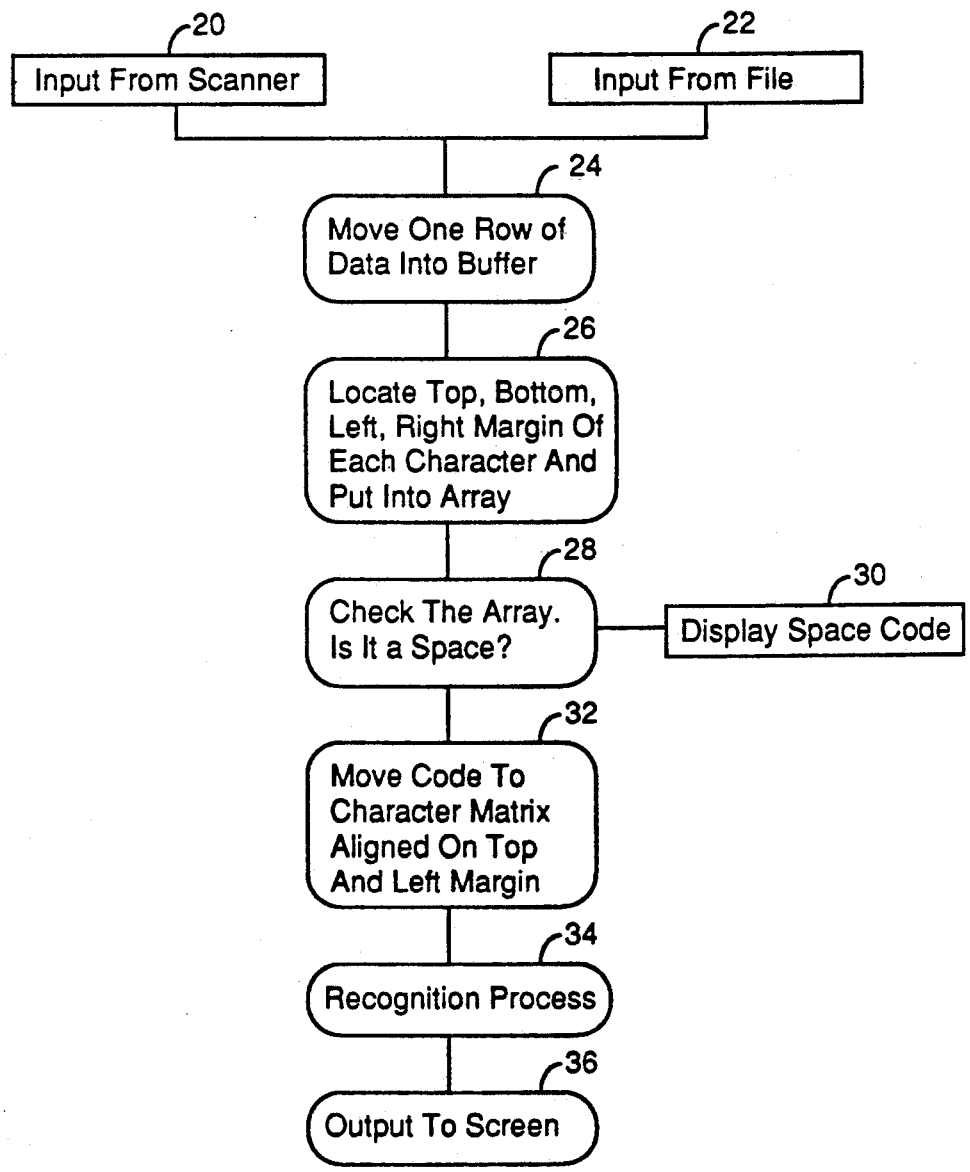
FIG. 2 depicts a functional block diagram of a program incorporating aspects of the present invention.

FIG. 2 illustrates a fundamental block diagram of the program according to the present invention. As described above, image data either comes from a scanner 20 as depicted in FIG. 2, or input from a previously stored file 22. The scanned data or file data is stored in buffer 24 where data is moved into the buffer until a character row is formed.

The program then proceeds to step 26 to locate the margins (top, bottom, left, right) of each character in buffer 24, and four positions are put into array or matrix 26.

The recognition algorithm according to the present invention starts with checking the array 26. The display will provide an indication of a space code at step 30 if the array determines that the character is in fact a space. If the character is not a space character, as indicated at step 28, the next step is to move the code to the character matrix aligned on the top and left margin, as indicated at step 32. This provides a character matrix with top and left margin aligned, as indicated at step 32. A detailed recognition process 34 will provide recognition of a particular character, as will be described in more detail hereinafter, and the resulting recognized character will be output to the screen 36.

The improved algorithm of the present invention is based on the feature of a character. There are many ways to look at a particular character. According to one aspect of the present invention, an optical character recognition (OCR) decision tree is utilized, as depicted in FIG. 3.

Figure 3:
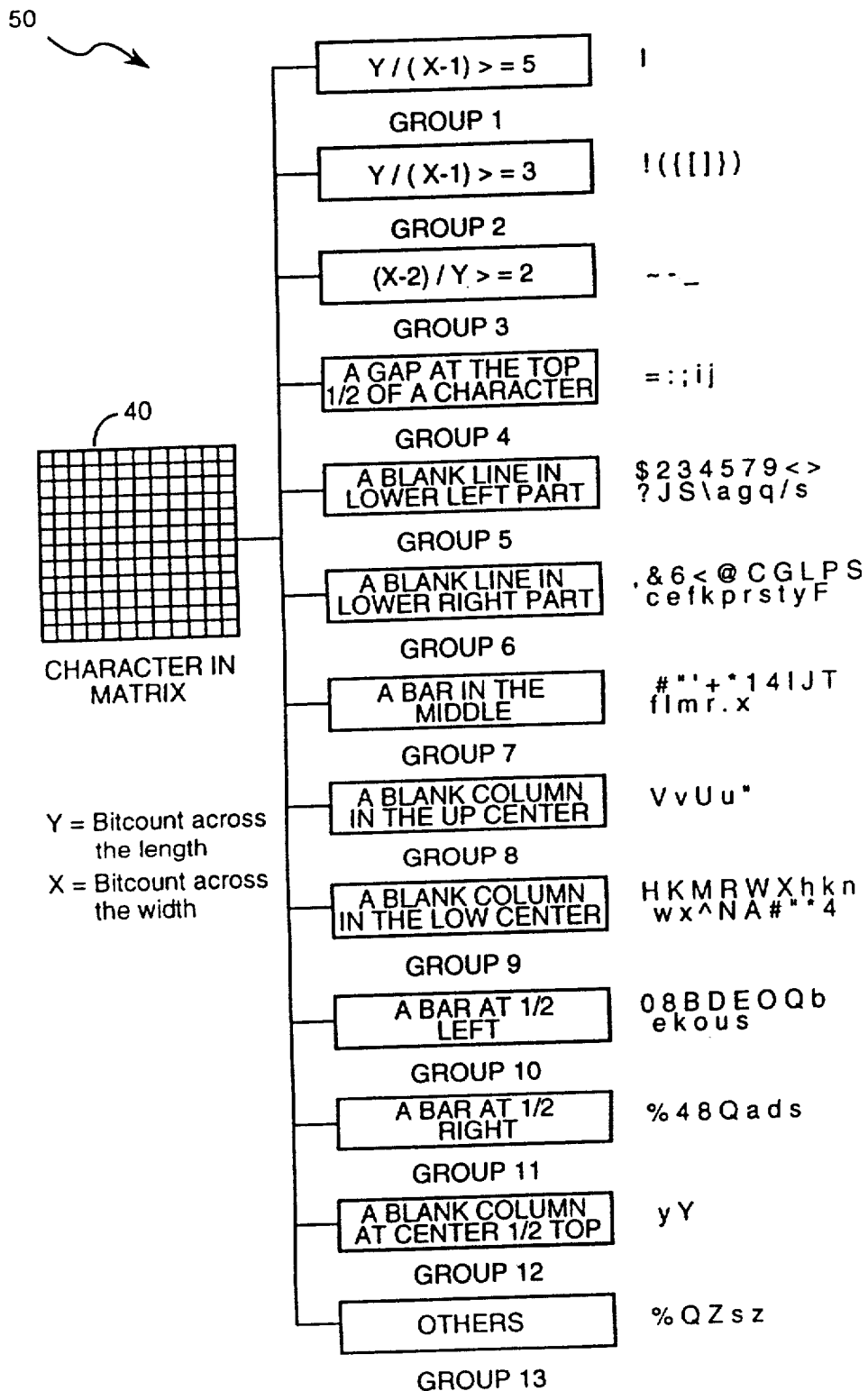
FIG. 3 depicts a diagram of an optical character recognition decision tree having a plurality of groups utilized in conjunction with the present invention.
Figure 4:
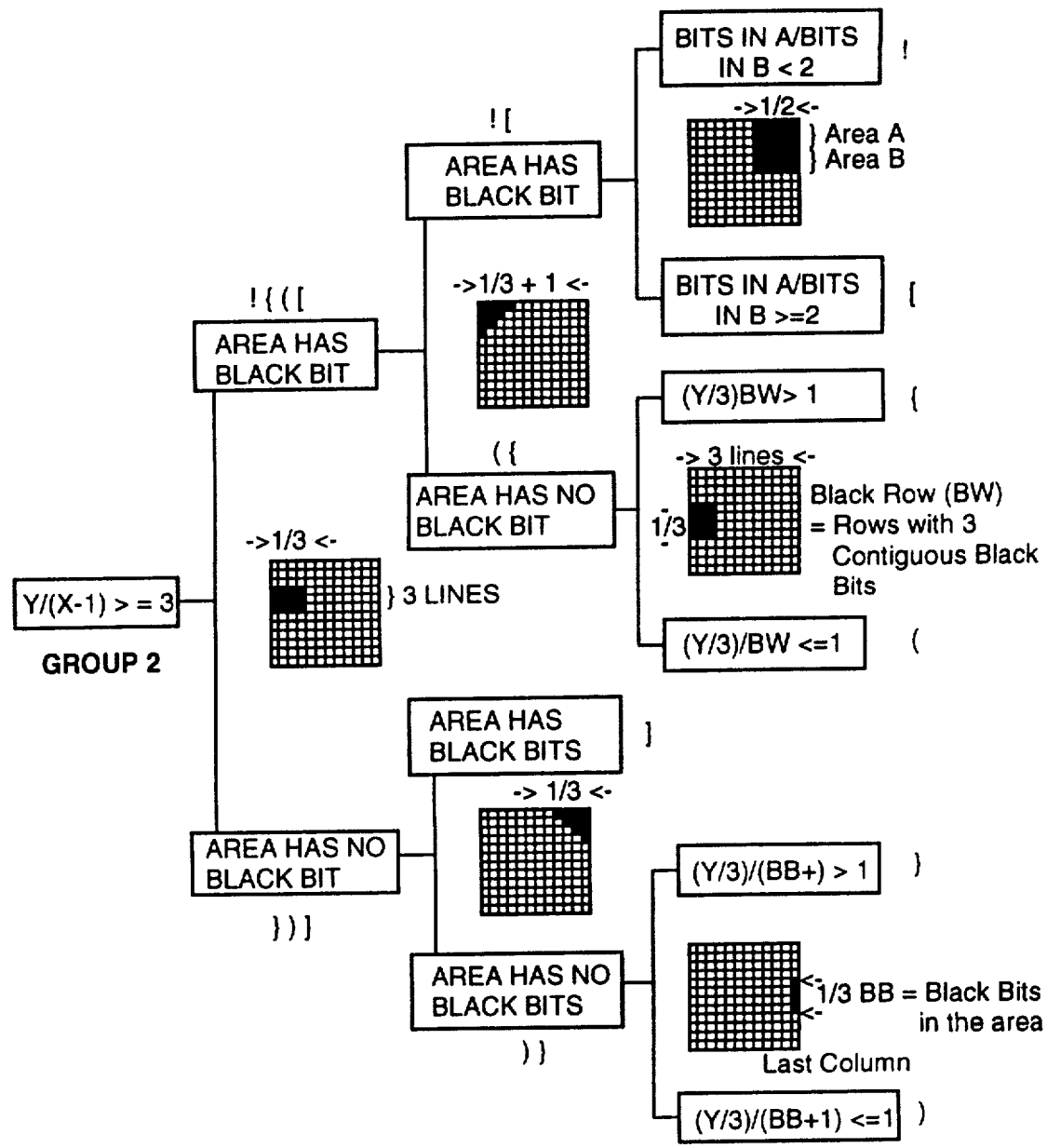
Figure 6:
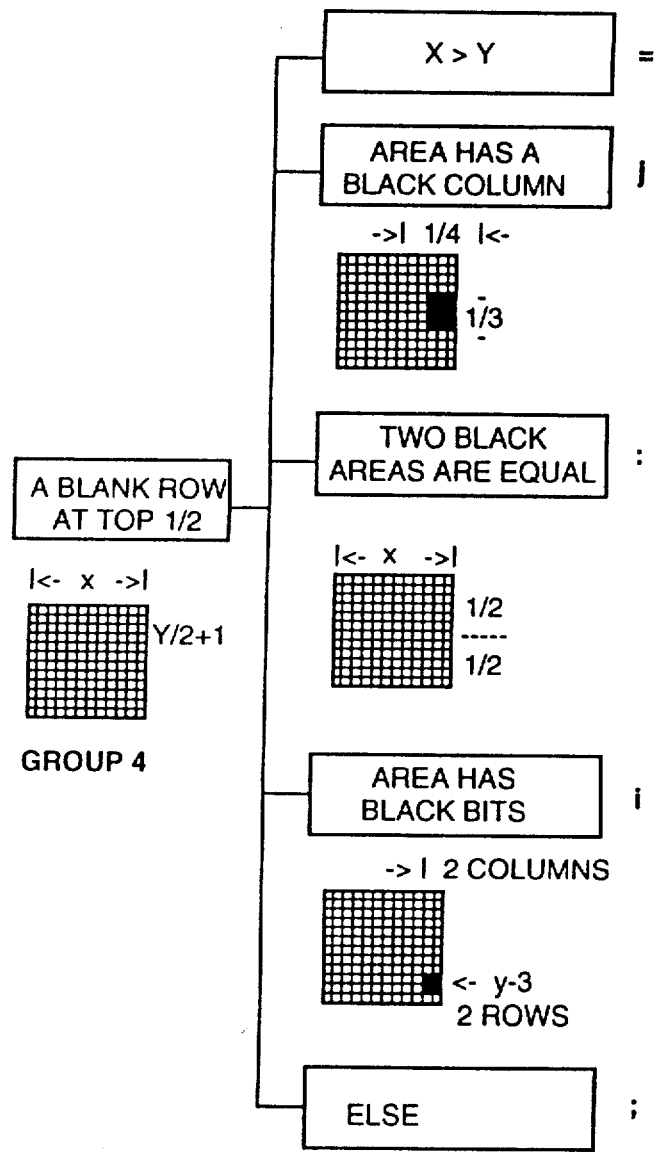
Figure 7A:
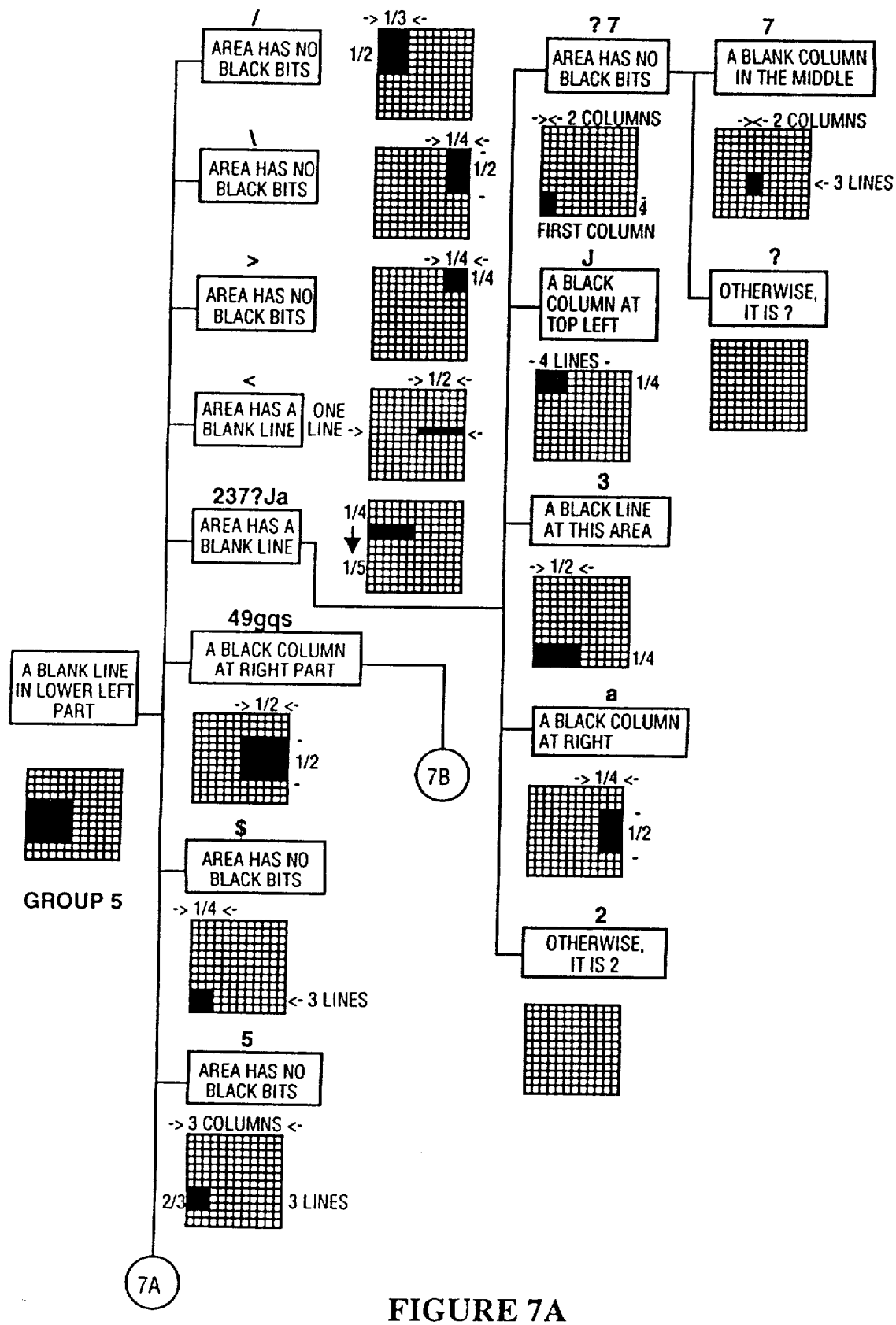
Figure 7B:
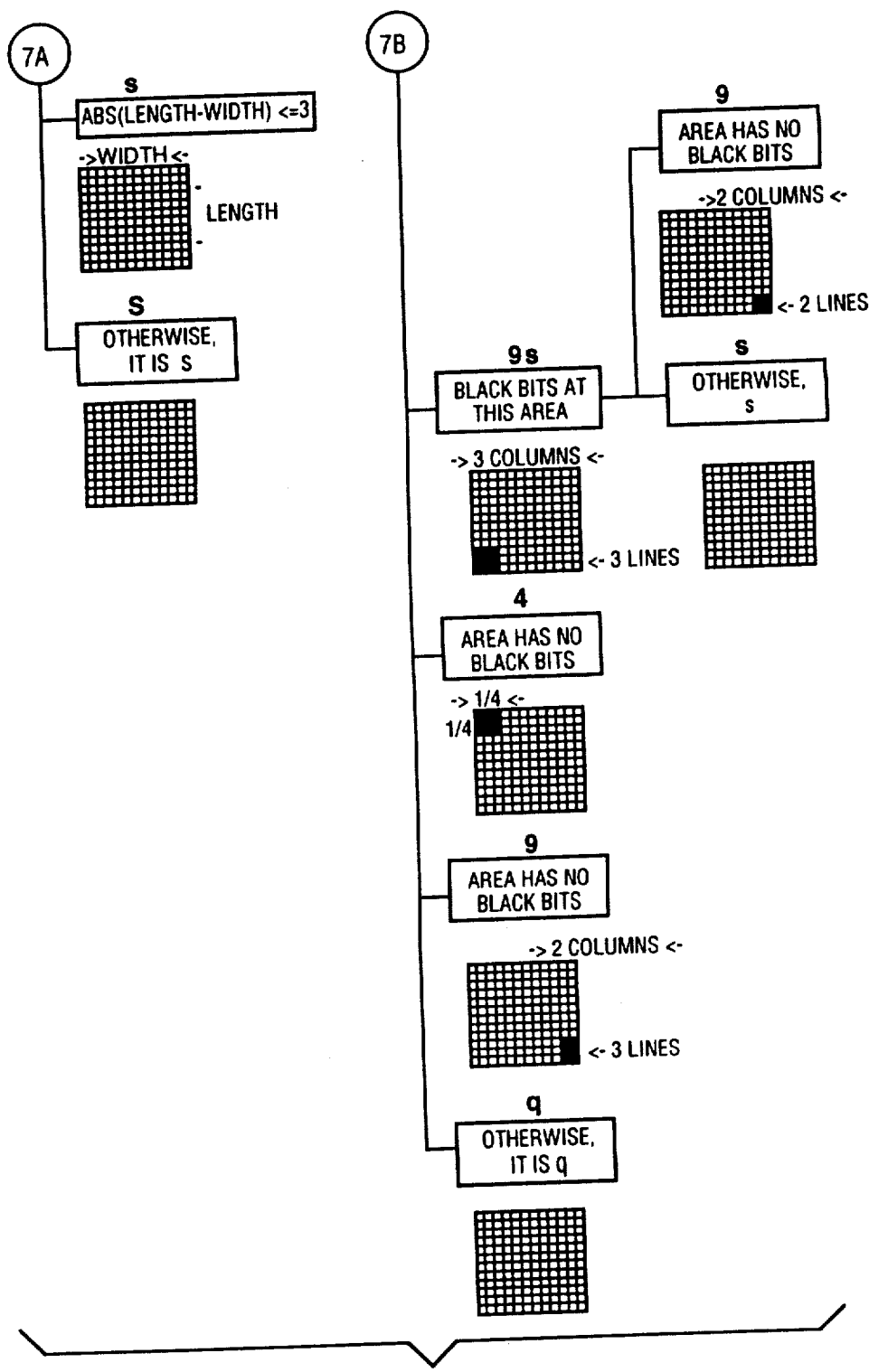
Figure 11B:
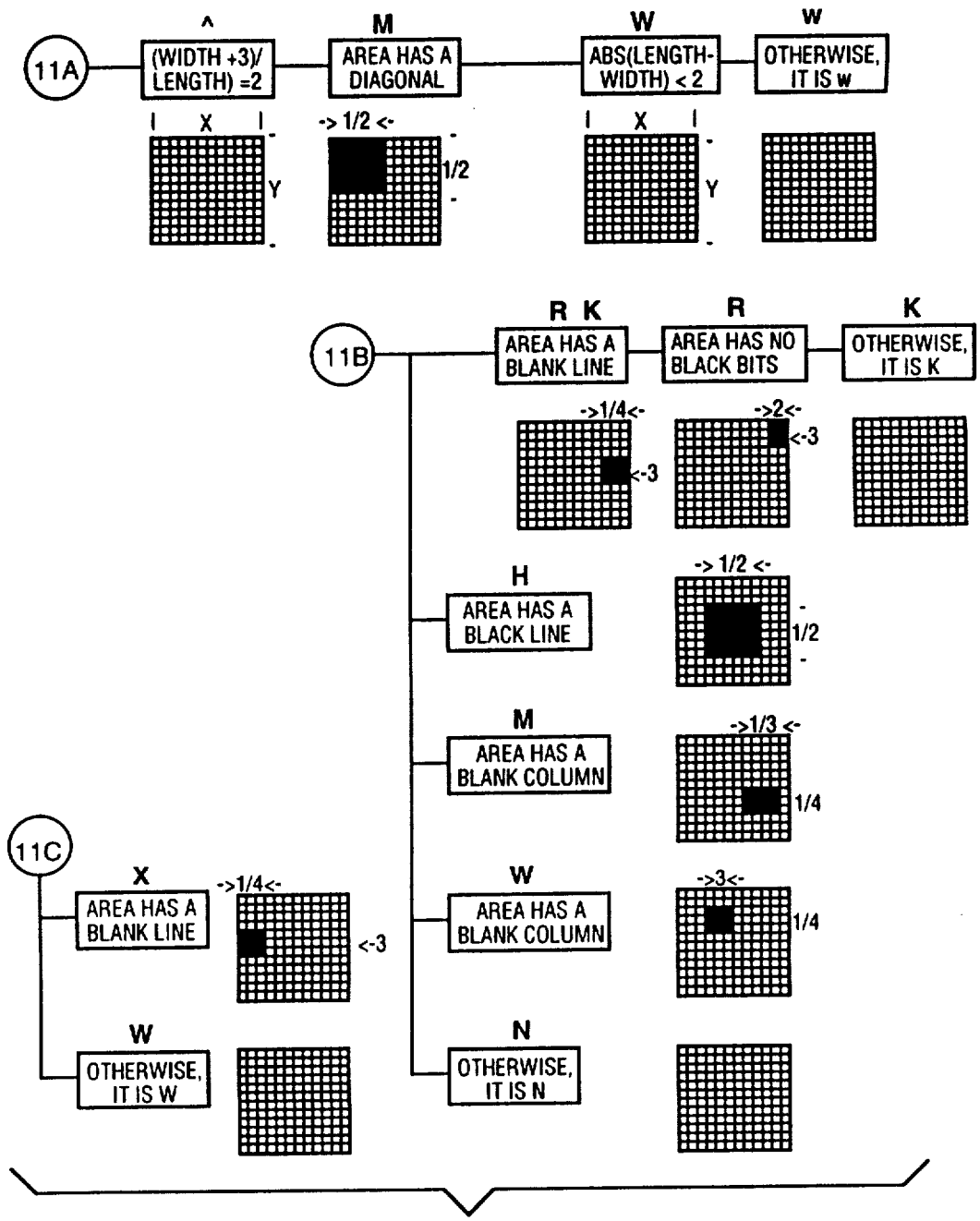
Figure 13:
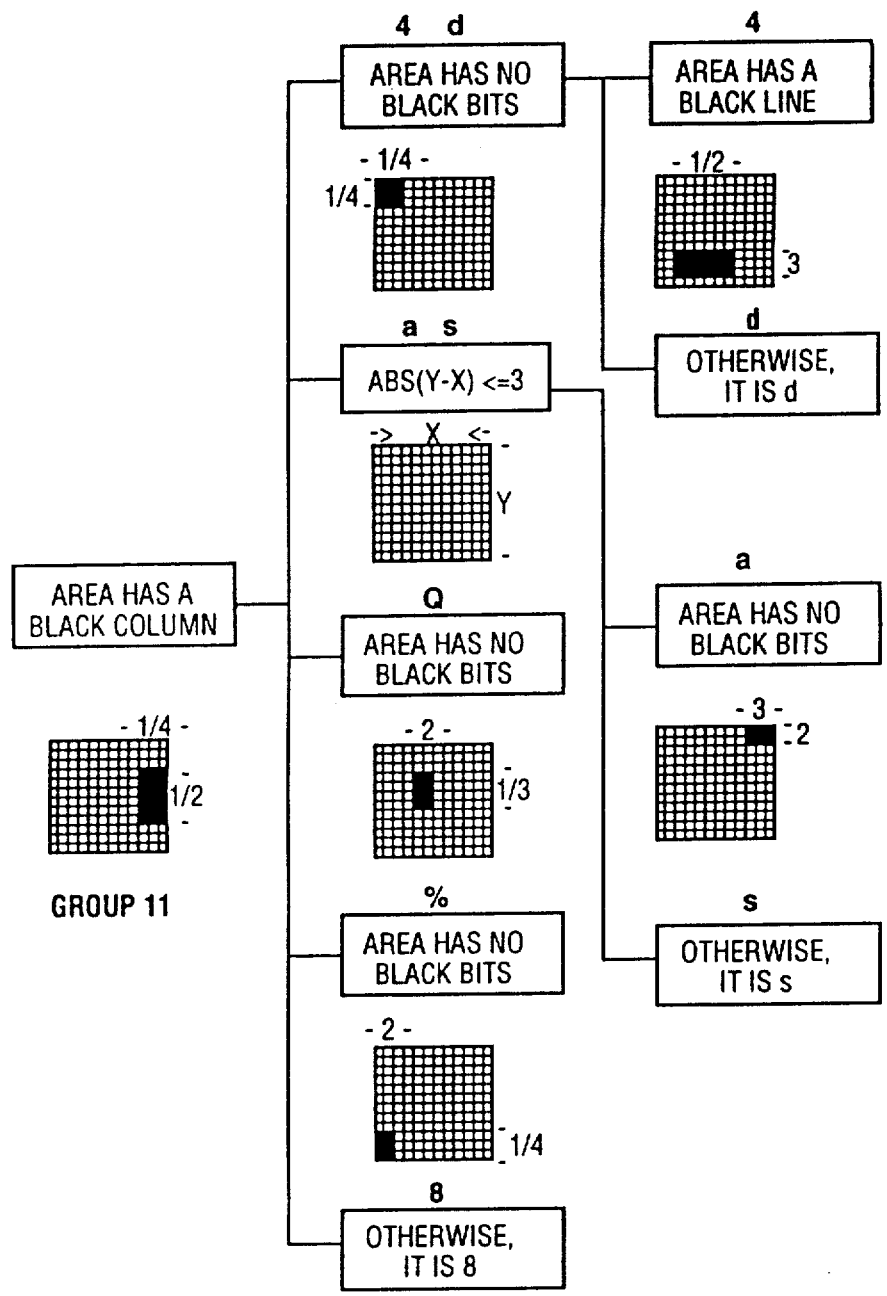
Figure 14:
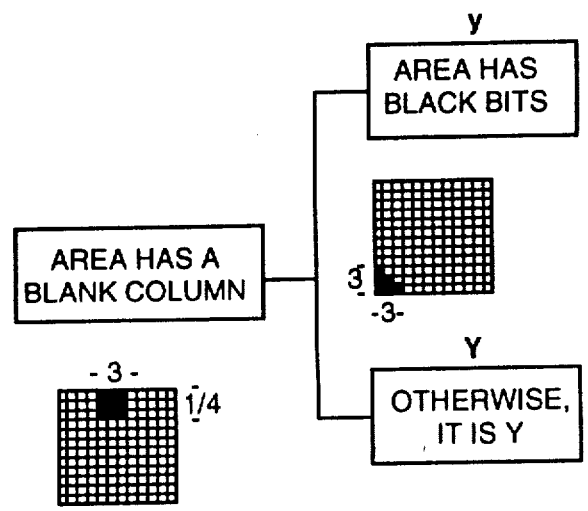
Figure 15:
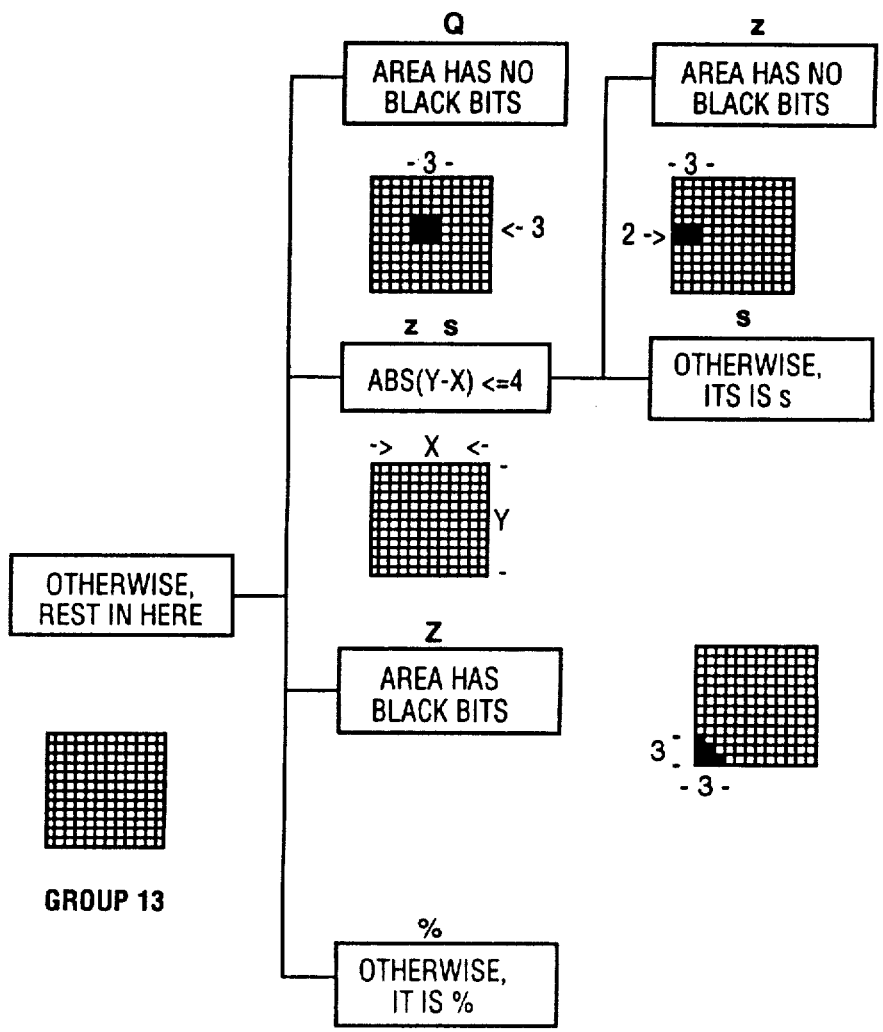

FIG. 3 depicts a decision tree with plurality of groups which, in one embodiment, includes thirteen groups or decisions within the decision tree 50. When a character is being moved to a matrix 40 in FIG. 3, its width (X) and length (Y) is calculated in terms of bit count. The first criterion to screen out characters is to determine the Y to X ratio, as indicated in Group 1 of the decision tree 50 of FIG. 3. In Group 1, if the Y/(X−1) ratio is greater than or larger than 5, the program considers the character to be " ".

The next groups in the decision tree 50 (Groups 2 and 3) use a similar method to determine another set of characters, as indicated with respect to Groups 2 and 3.

Group 4 in FIG. 3 is the class where characters have a gap at the top, such as a colon (:), semi-colon (;) and so on.

Group 5 provides a decision capability for a blank line in the lower left part of matrix 40.

Group 6 provides an indication of a blank line in the lower right part of matrix 40.

Group 7 provides an indication for a bar in the middle of matrix 40.

Group 8 provides for an indication of a blank column in the upper center of matrix 40.

Group 9 provides an indication of a blank column in the lower center of matrix 40.

Group 10 provides an indication of a bar at the left portion of matrix 40.

Group 11 provides an indication of a bar at the right hand portion of matrix 40.

Group 12 provides an indication of a blank column at the center half portion of matrix 40.

Group 13 provides an indication of other types of characters.

For each of Groups 1-13 of the decision tree, initial indications of the particular type of alphanumeric characters are provided, as depicted in FIG. 3. The corresponding indicated types of characters for each group of decision tree 50 is illustrated in the right hand portion corresponding to a particular group.

For example, a vertical line portion is indicated as the character for the output of Group 1.

Group 8 has an output of indicating either upper or lower case letters "V" or "U".

Group 12 indicates as a particular character the lower or upper case letter "Y".

The similar types of character designations are indicated as the particular outputs from the particular groups of decision tree 50.

Figure 4:
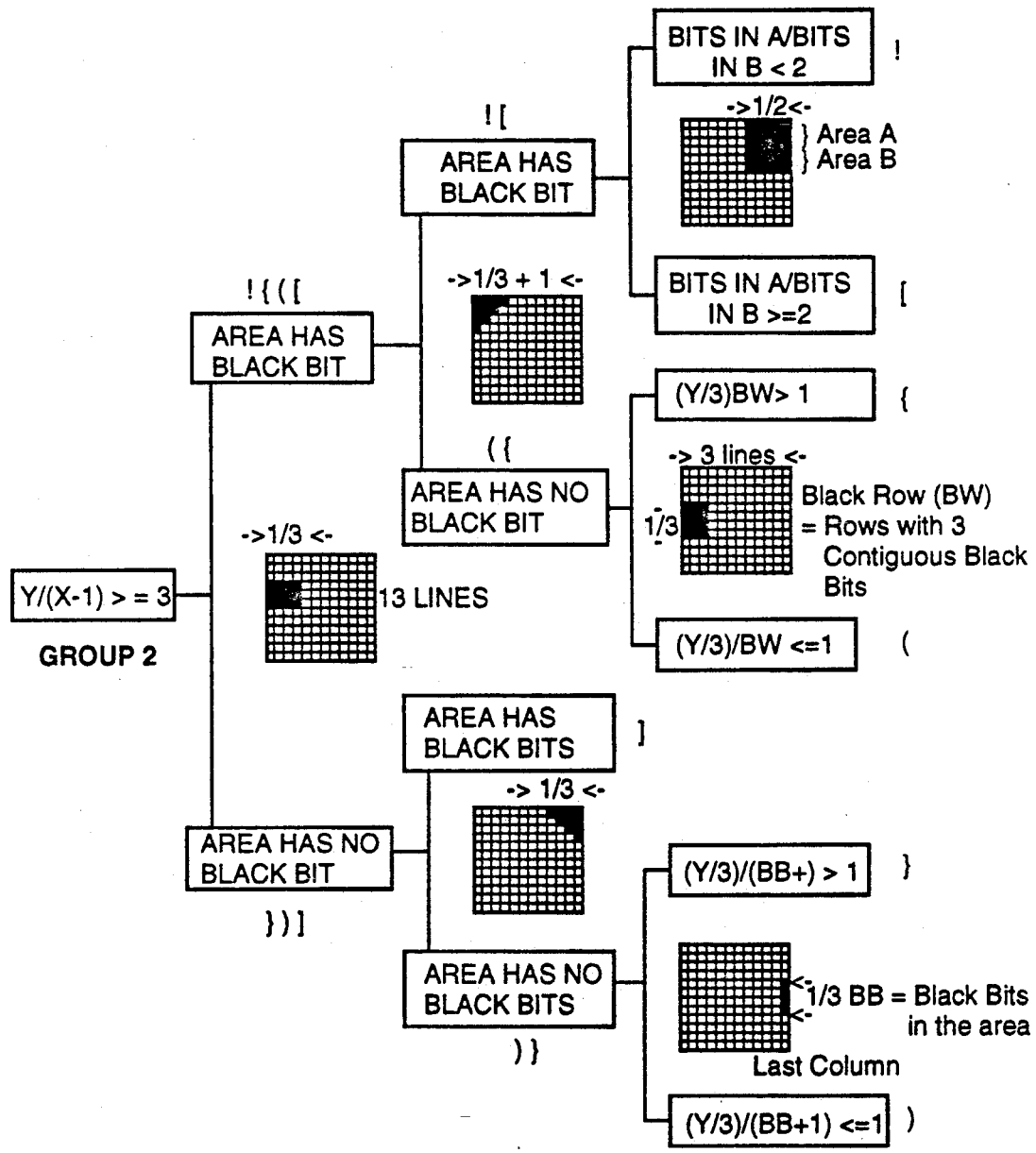
FIGS. 4-6, 7A-7B, 8A-8B, 9A-9B, 10, 11A-11B, 12-15 depict more detailed subgroups for each of the groups of FIG. 3.

As a further example, Group 2 characters of FIG. 3 are subclassed in subgroups by examining the blackened area of the matrix to determine whether it has black bits or not. This aspect is depicted in FIG. 4, which is a subgroup of Group 2 of FIG. 3. It can be seen in FIG. 4 that the particular type of character to be determined can be analyzed by determining whether it has black bits or not within the matrix 40, and where the black bits are located.

Assuming that the algorithm has designated a particular character from Group 2 of FIG. 3, the program enters a subgroup depicted in FIG. 4, to determine whether the area has a black bit or not, and by this progressive approach, provides an indication of whether the character is one of the symbols as indicated, as an output of FIG. 2. It can be seen, therefore, that the particular decision tree algorithm provides for determination of a particular character by the mask-/decision tree approach.

Figure 5:
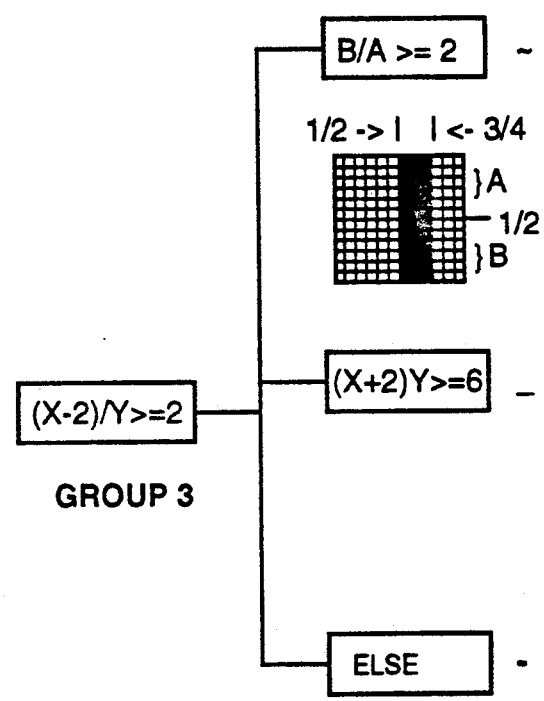
Figure 6:
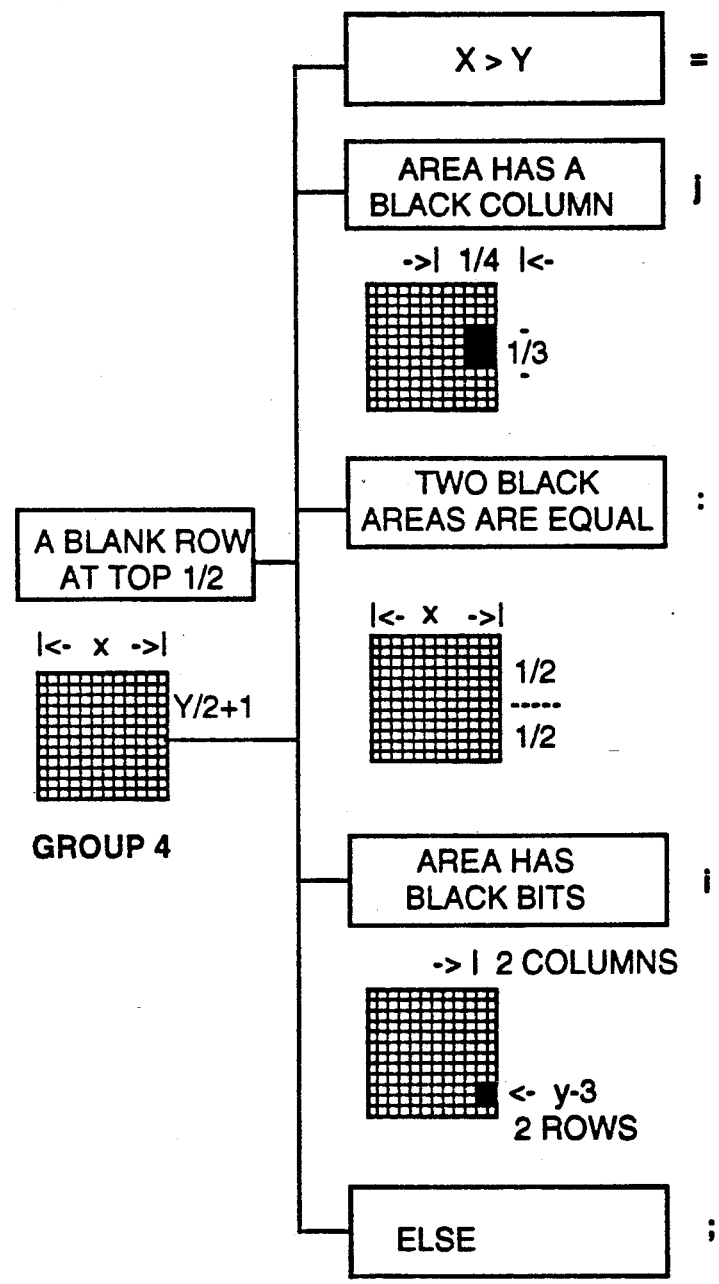
Figure 7A:
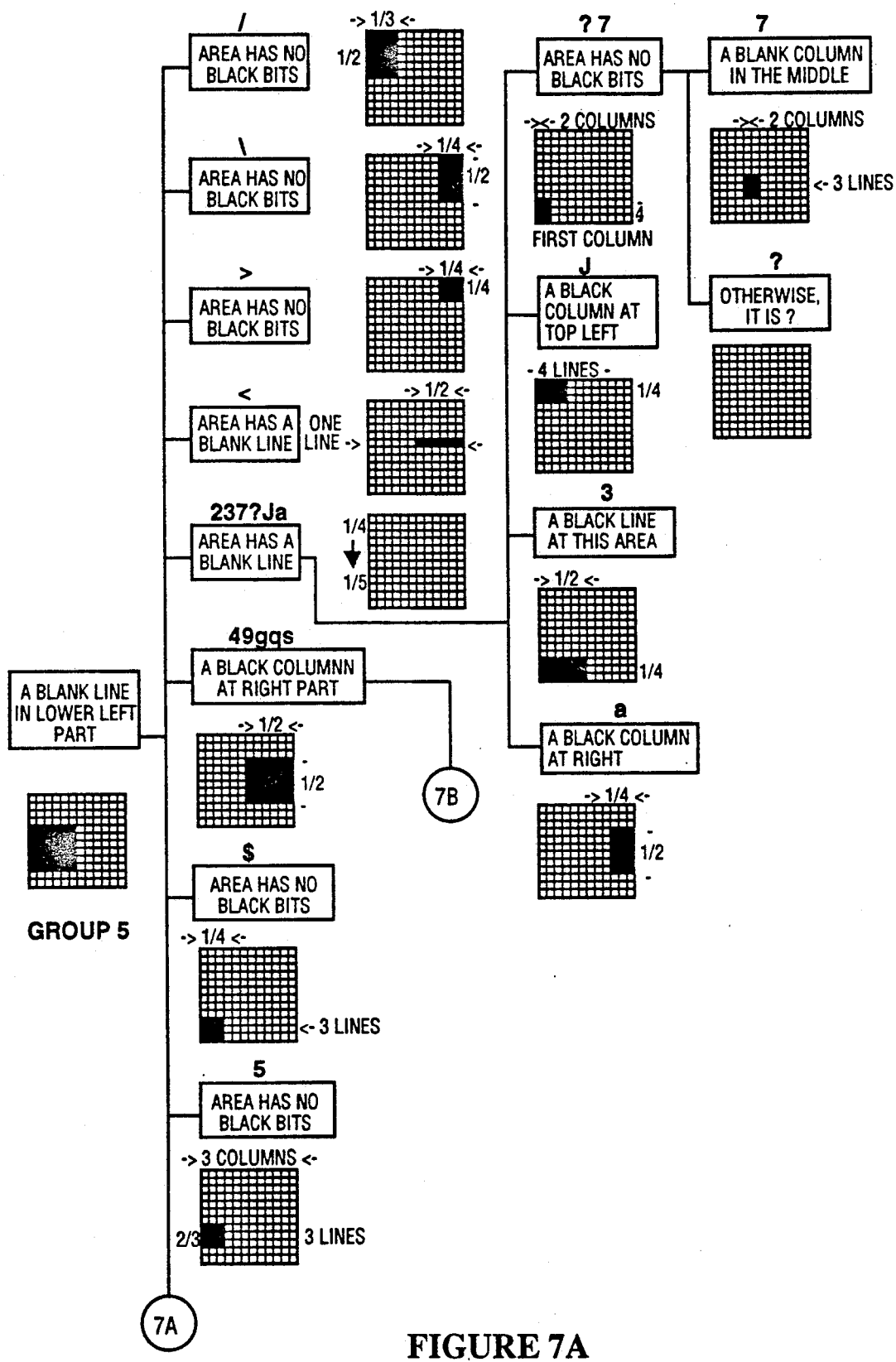
Figure 7B:
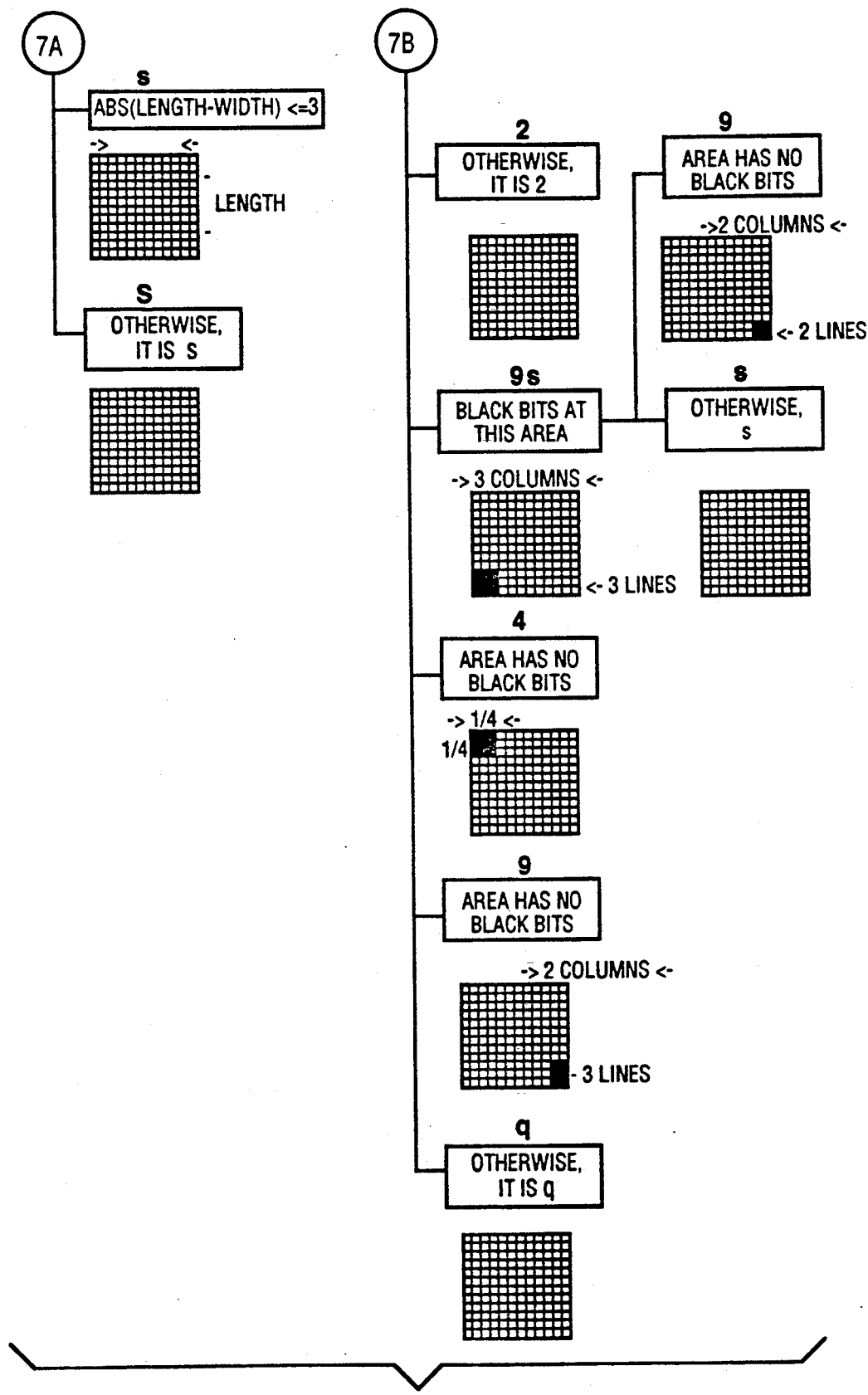
Figure 8A:
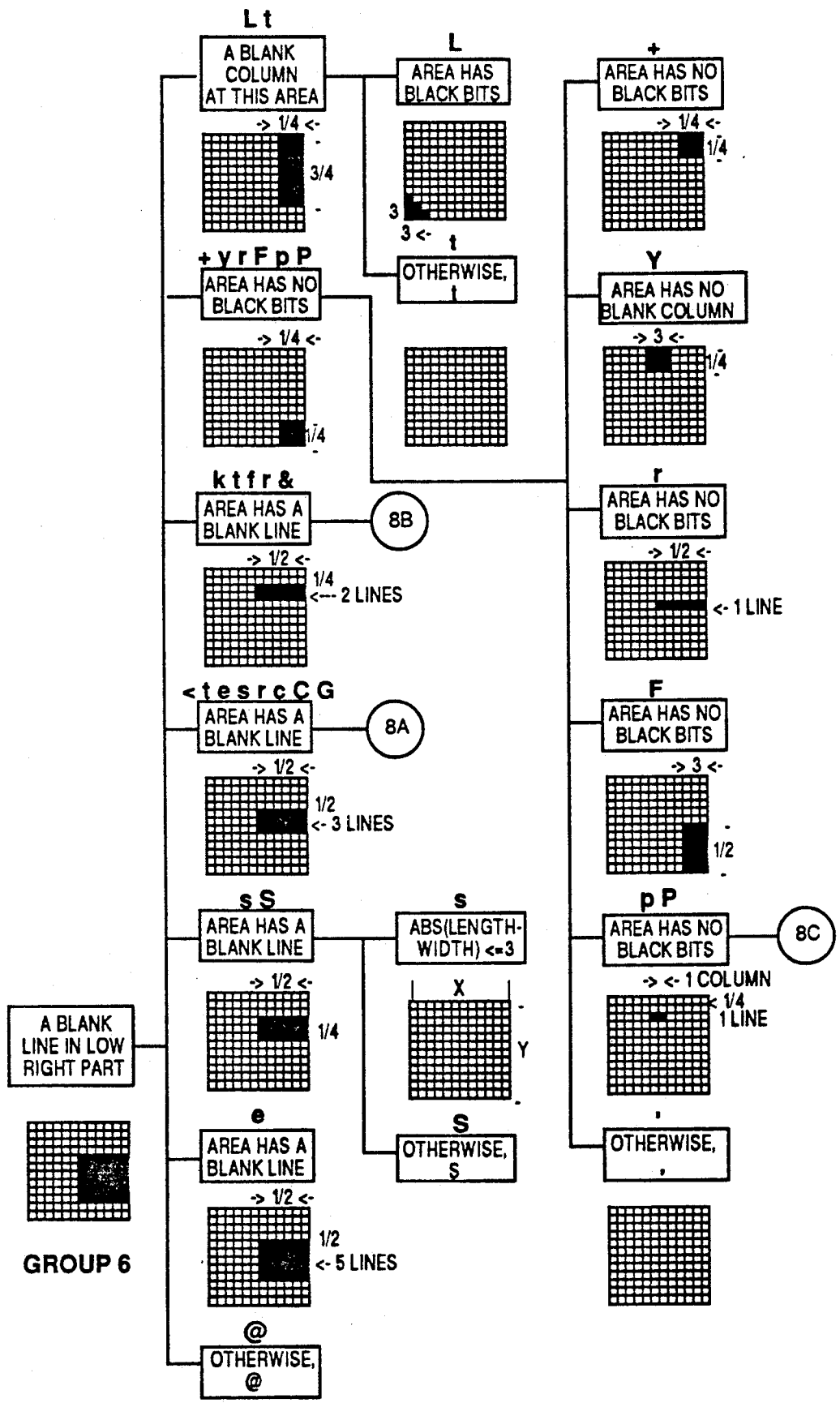
Figure 8B:
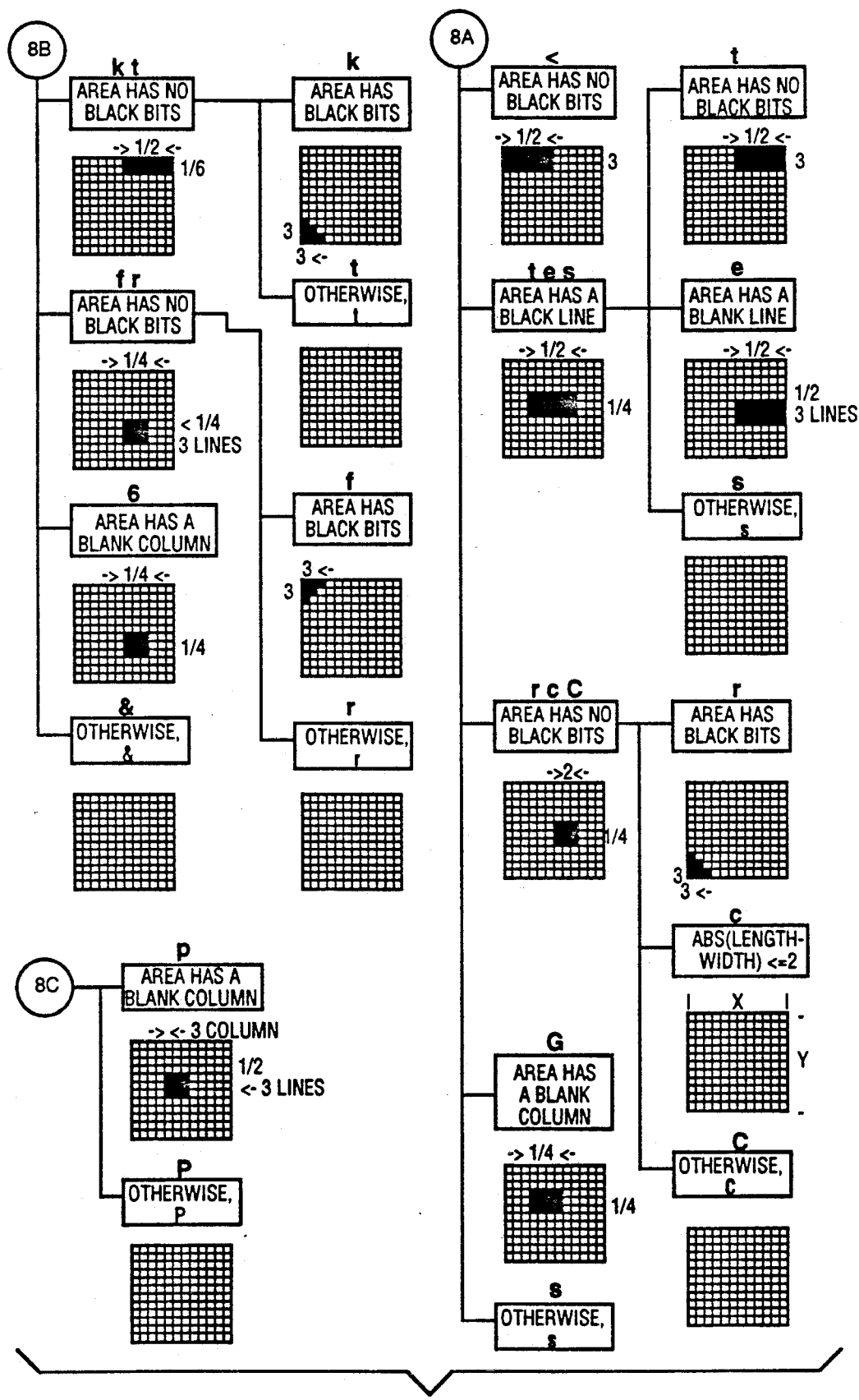
Figure 9A:
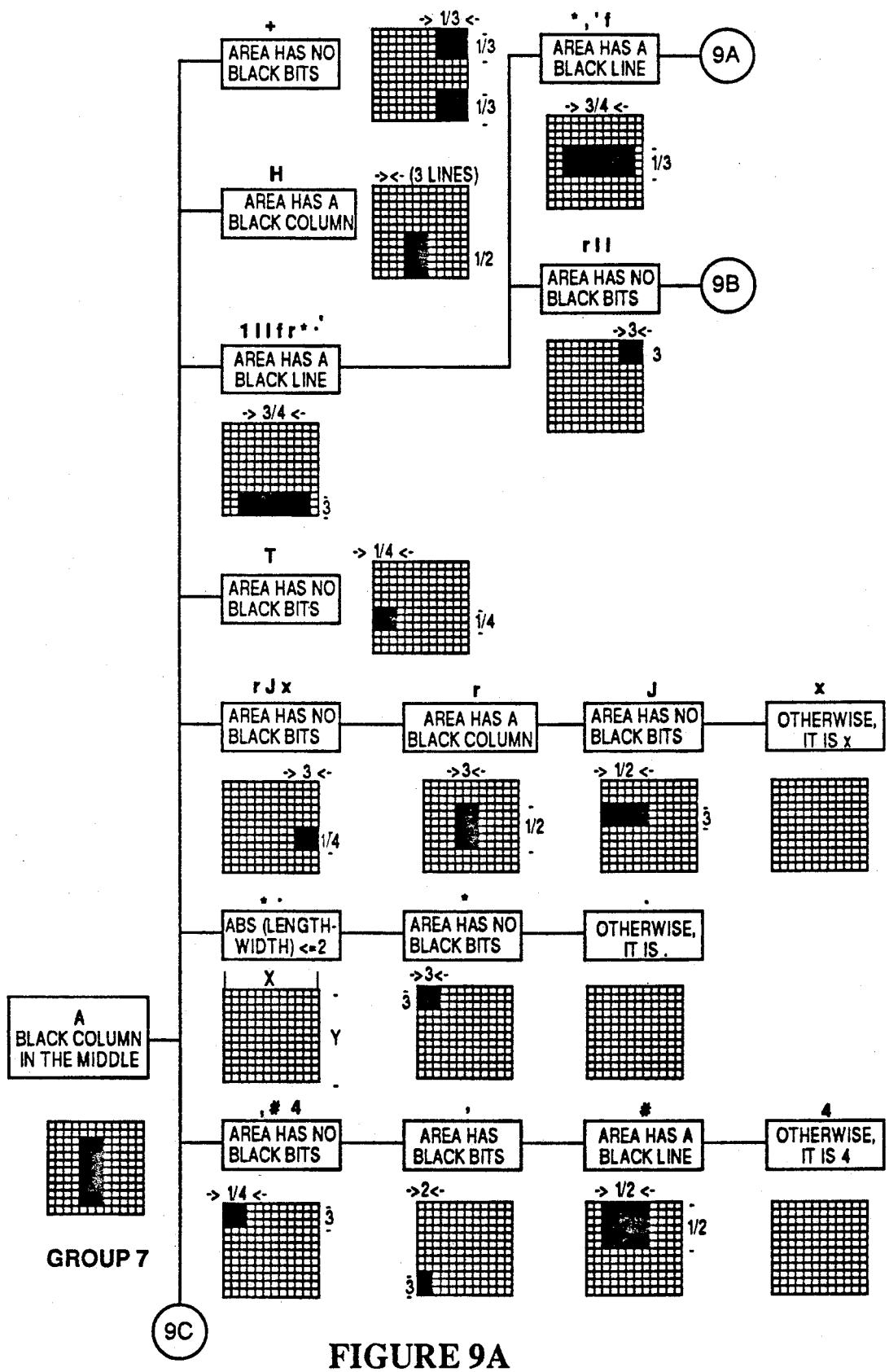
Figure 9B:
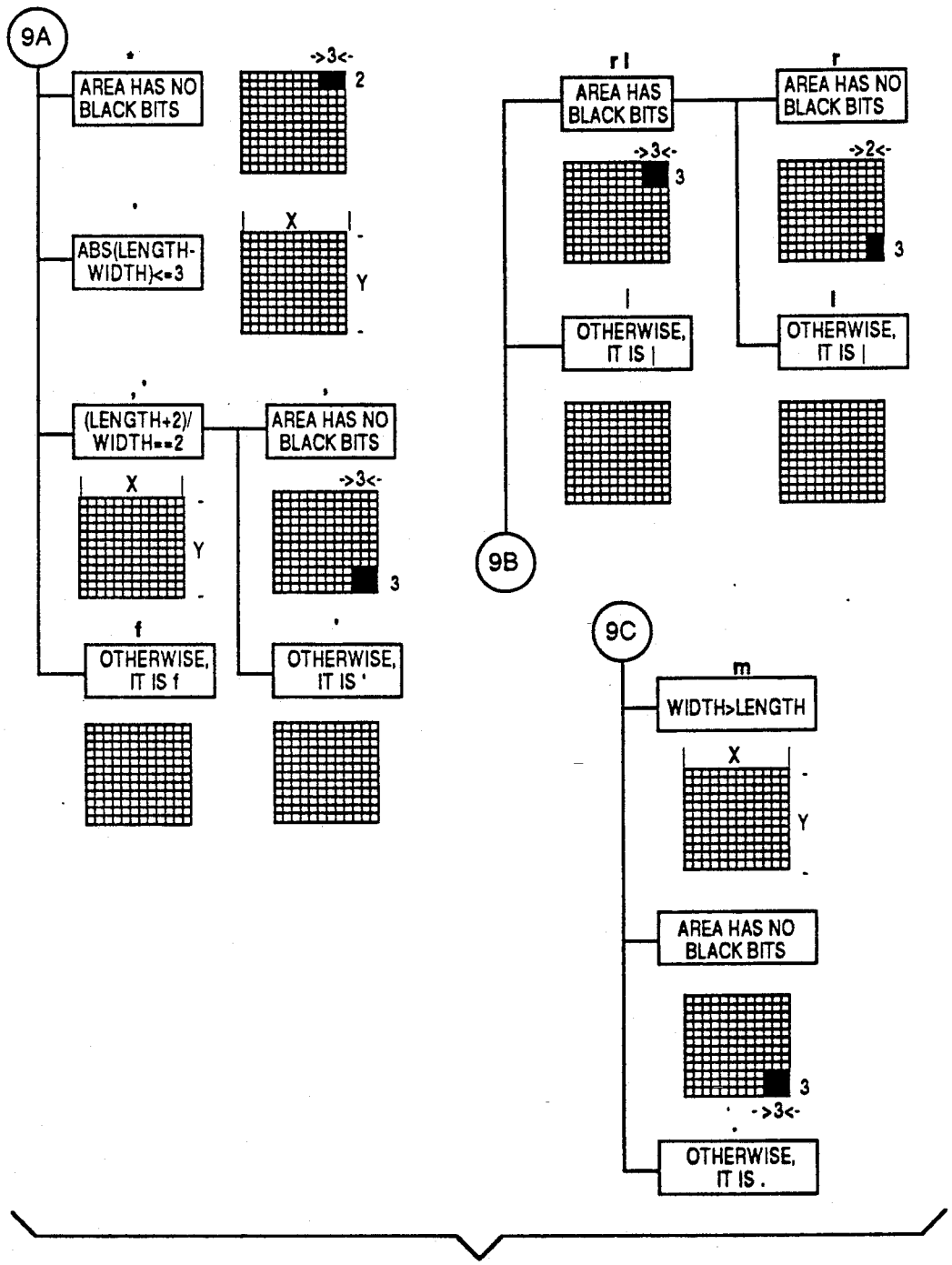

FIG. 5 depicts a diagram of the types of character which would be selected by Group 3. This would be whether the particular designations are having black bits in the particular areas of matrix 40 of FIG. 3.

FIGS. 6, 7A-7B, 8A-8B, 9A-9B, 10, 11A-11B, 12-15 depict the subgroup outputs of Groups 4-13, respectively, of FIG. 3.

Figure 14:
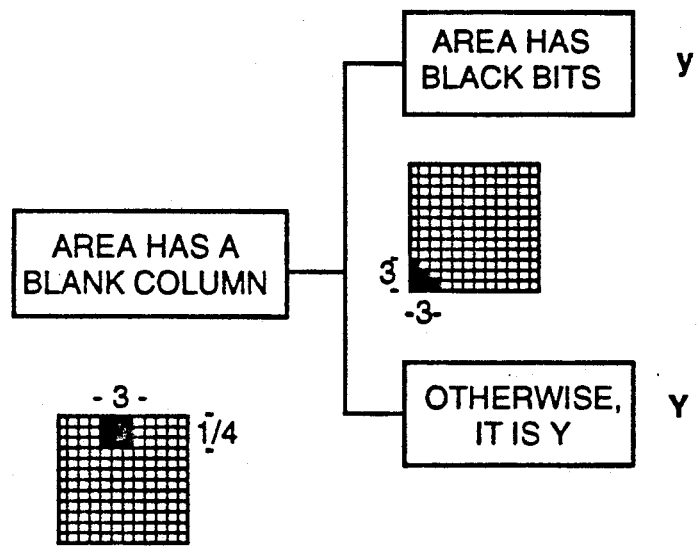
Figure 15:
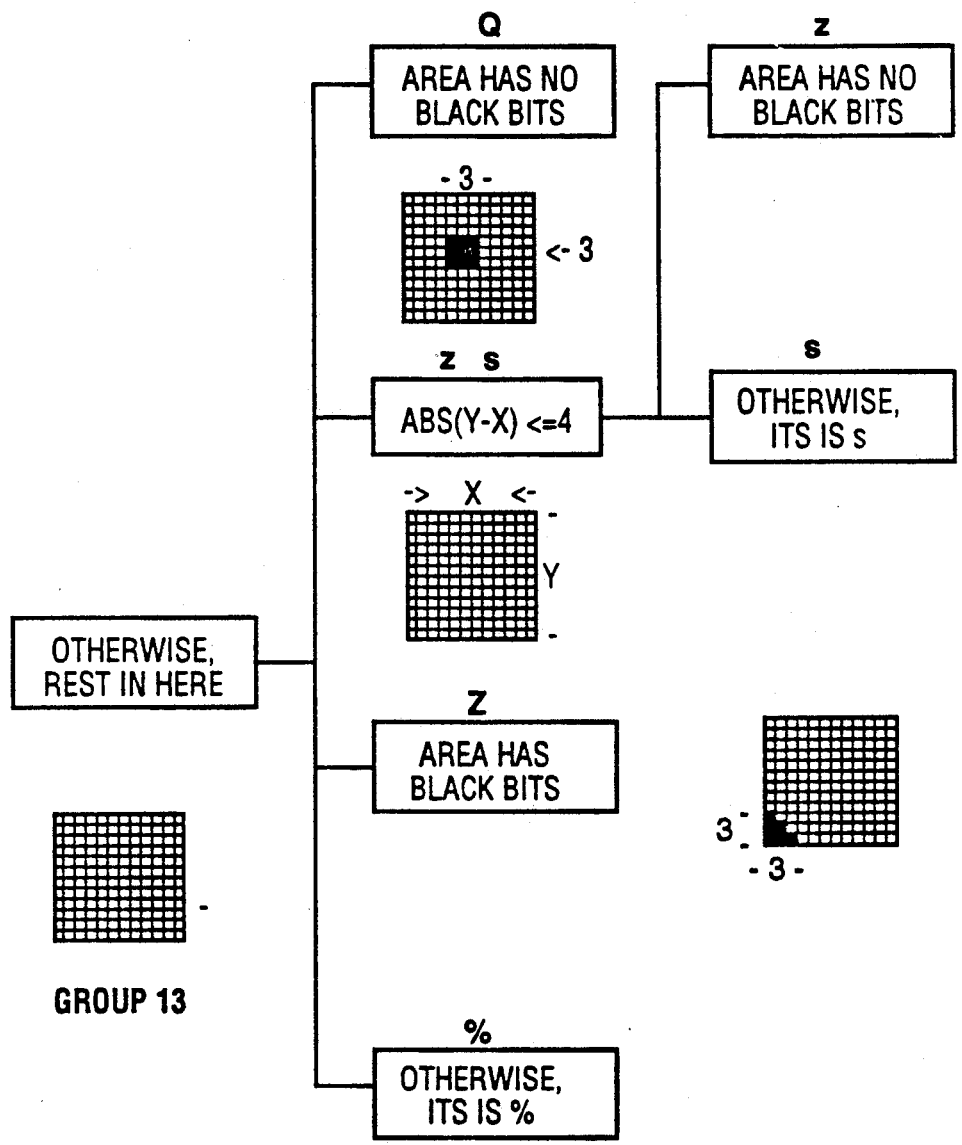
Figure 1:
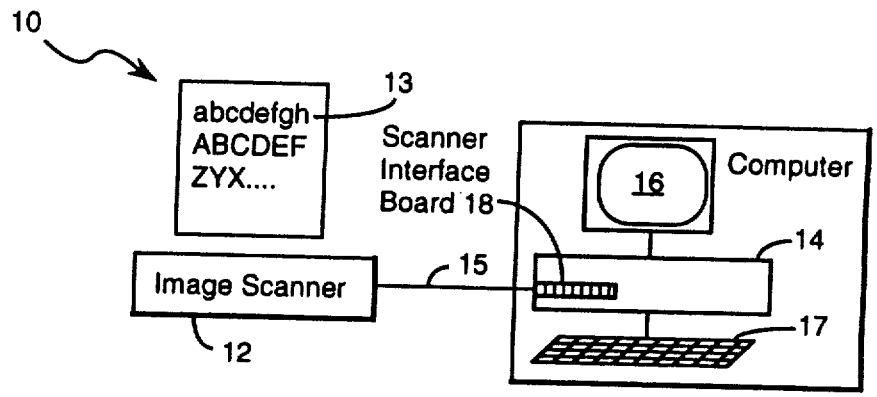
Figure 2:
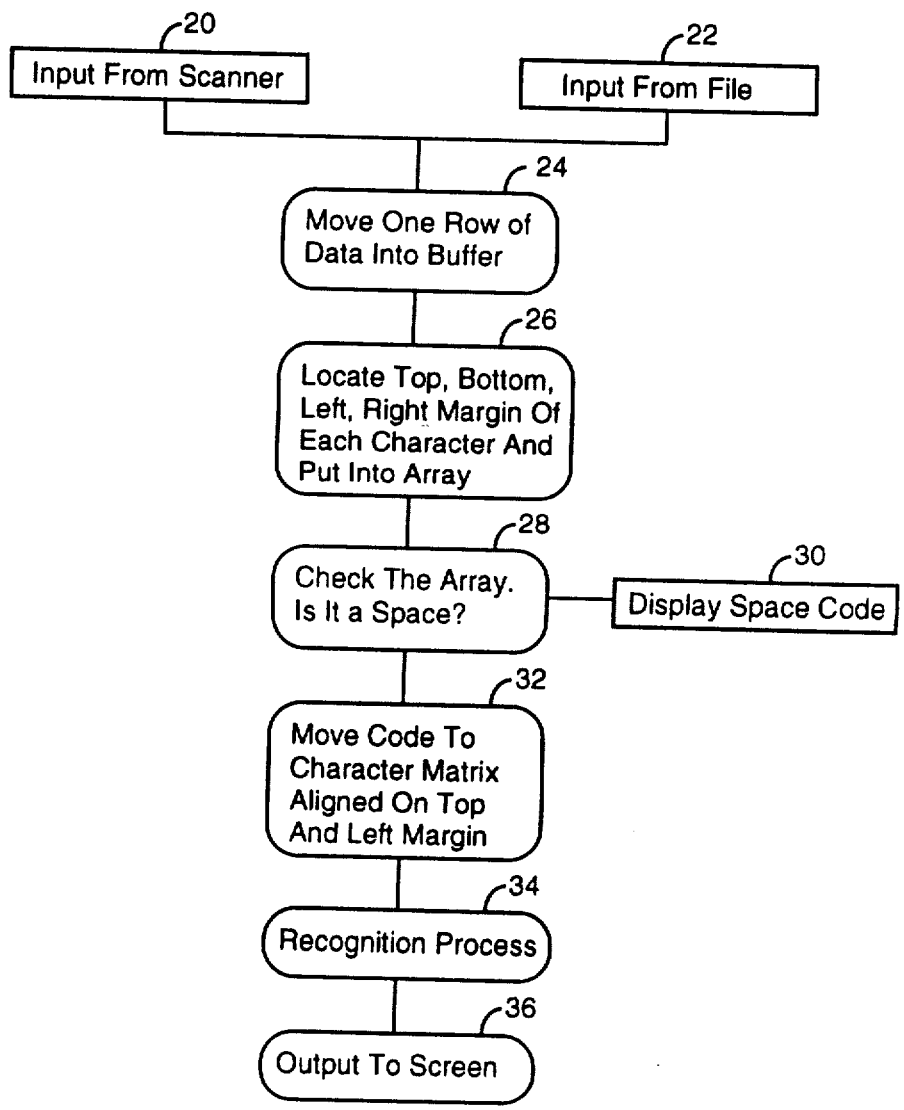

As an example of a particular type of character, consider the output of Group 12 of FIG. 3, which indicates that the particular character is either a lower case y or an upper case Y. The Group 12 output then determines whether the area has a blank column. If a particular area has black bits as indicated in FIG. 14, then it is determined that the character is a lower case y. Otherwise, the program determines that the character is an upper case Y.

Figure 10:
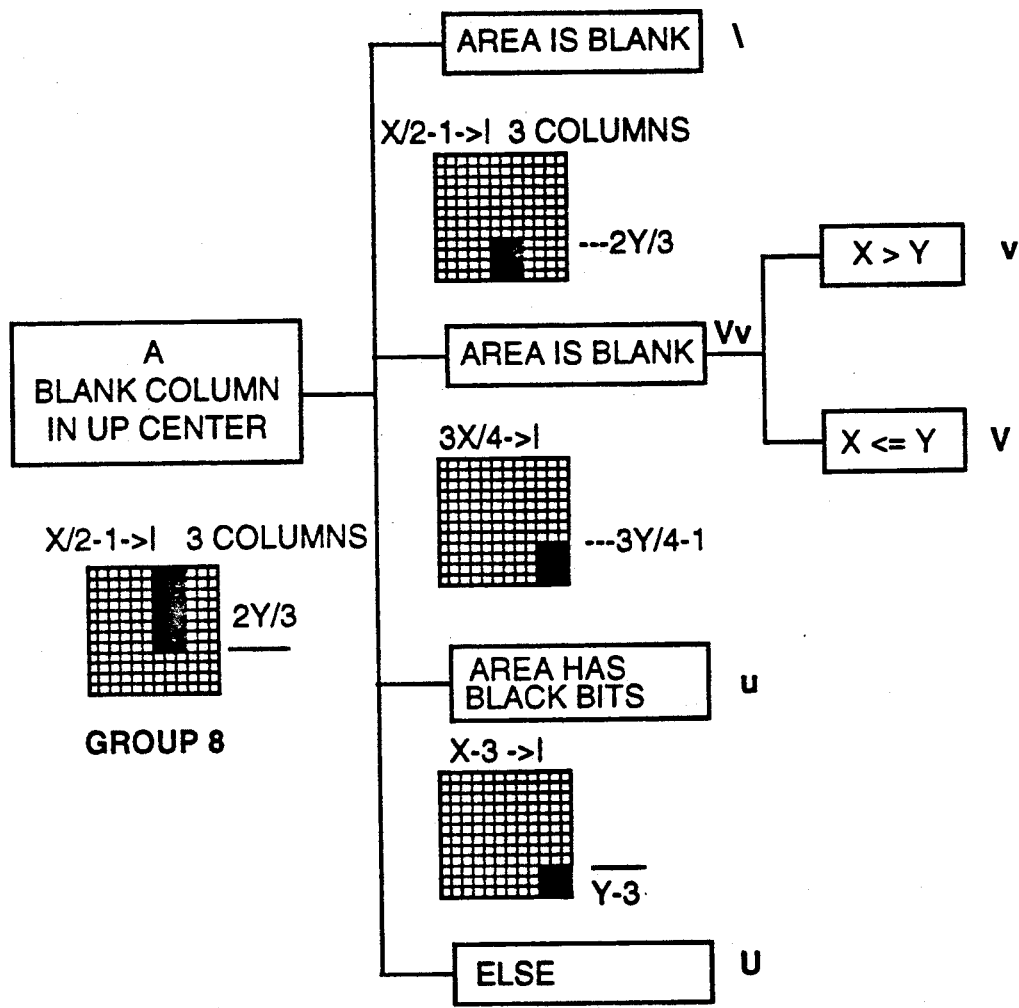
Figure 11A:
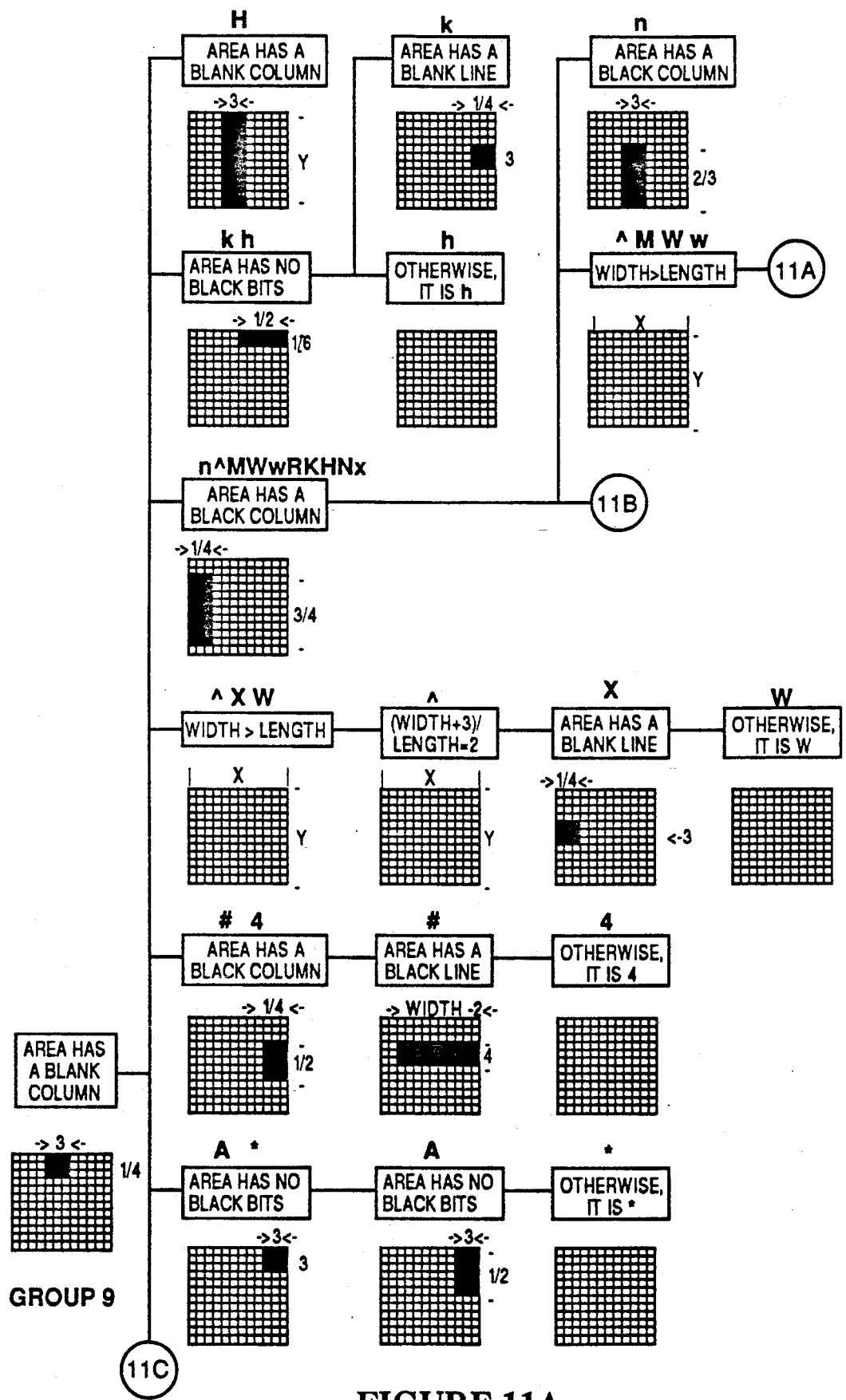
Figure 11B:
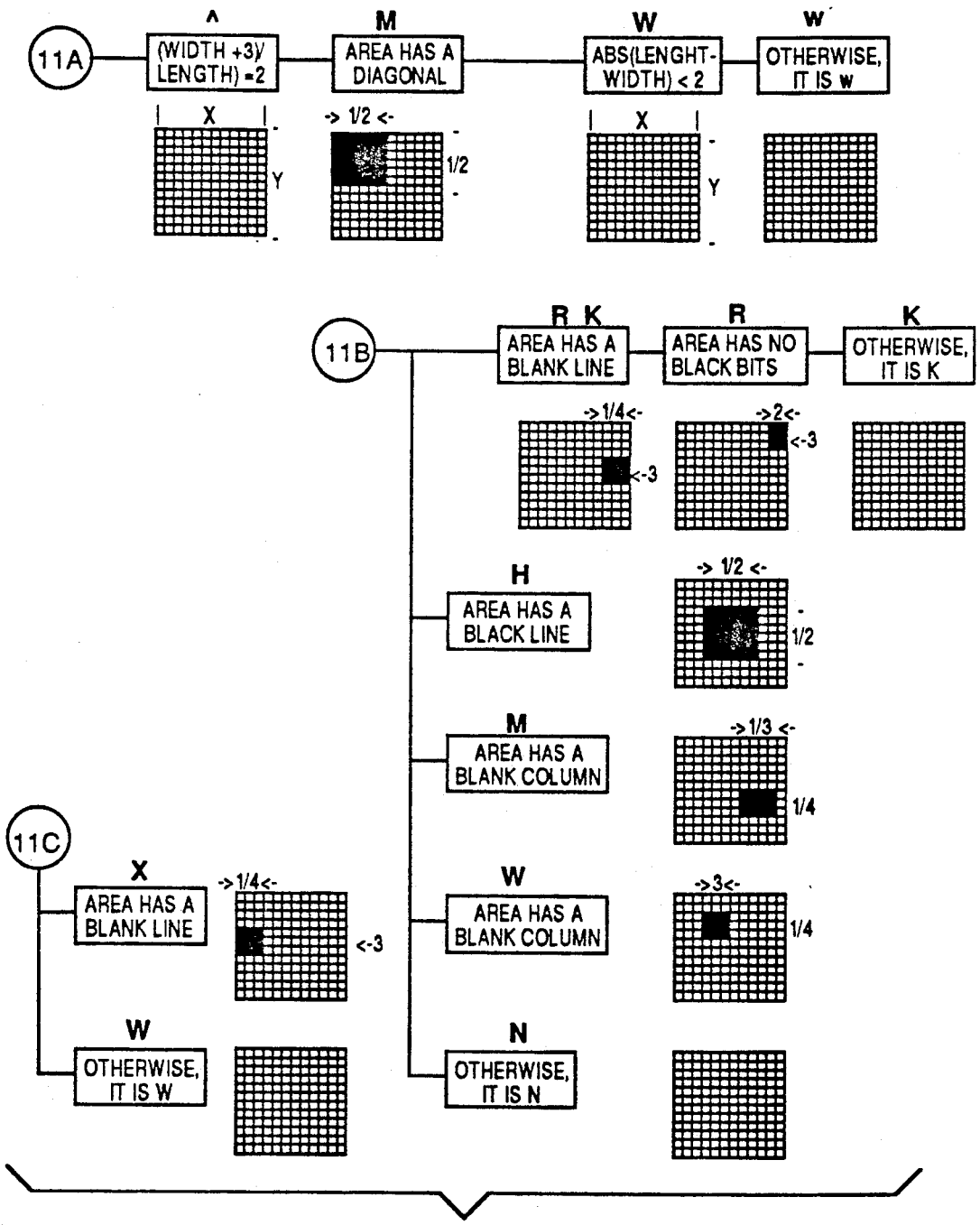
Figure 12:
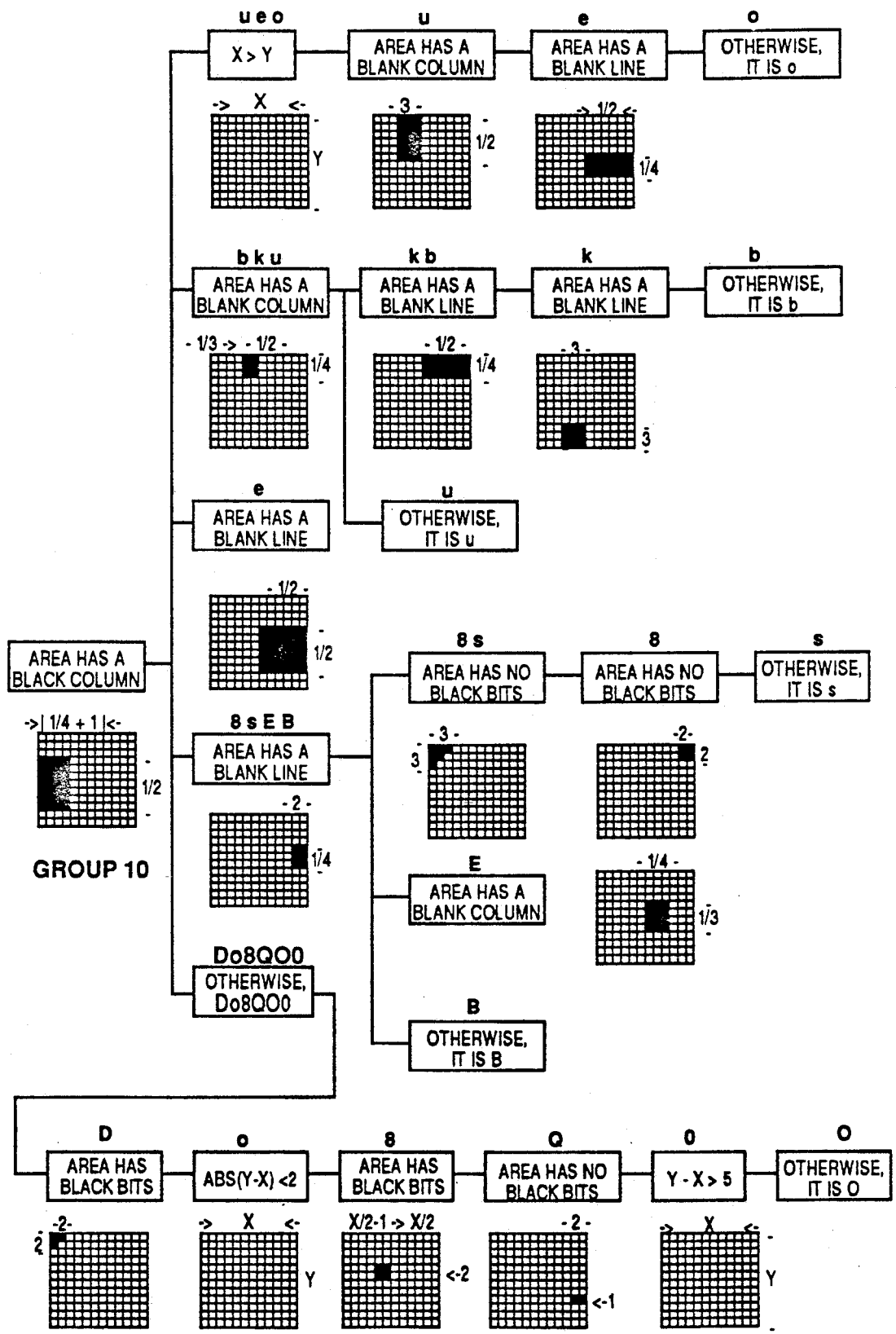
Figure 13:
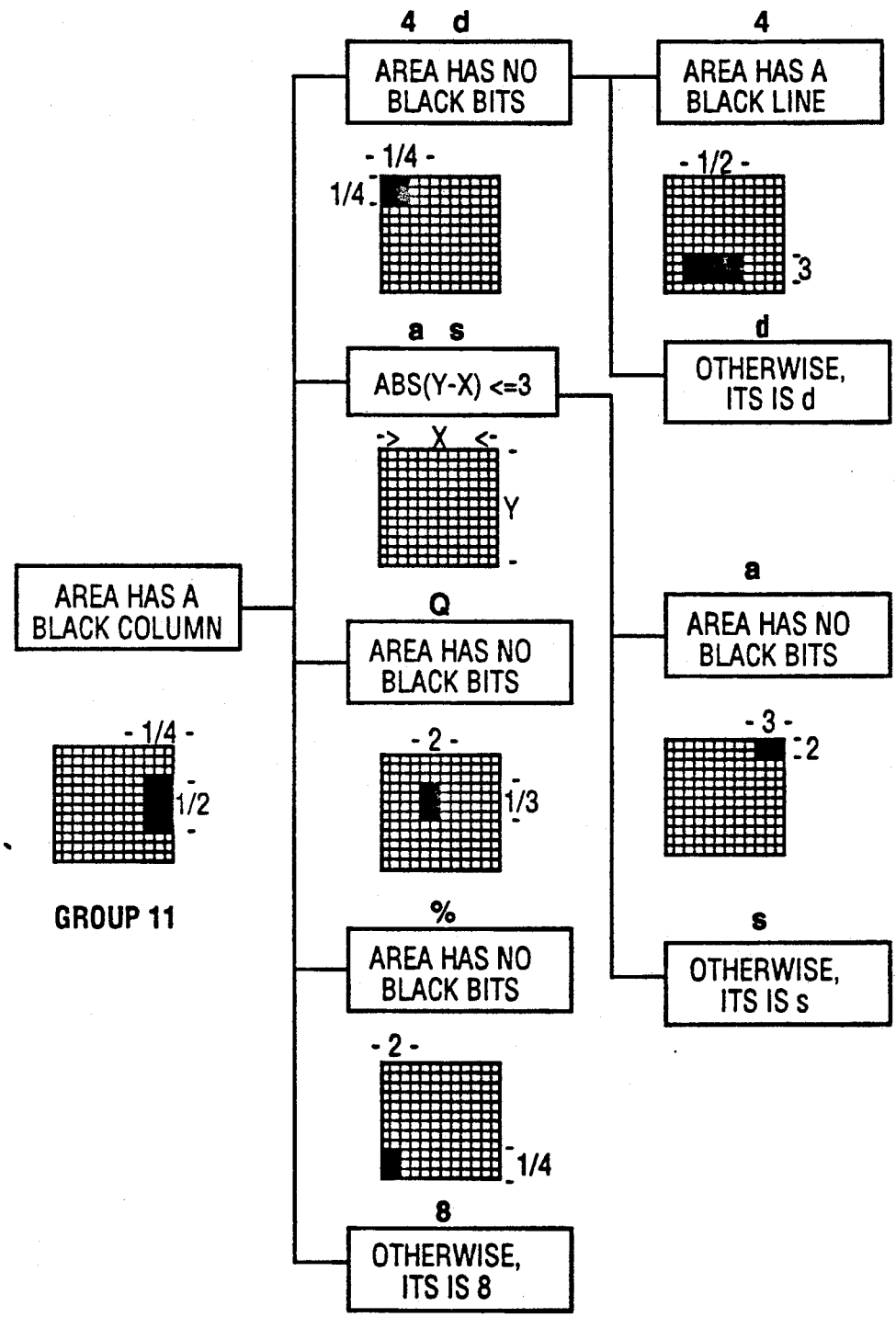

Similarly, the output of Group 8 provides the decision tree approach of determining whether the characters are upper case V, lower case v, upper case U or lower case u, as indicated as the output of Group 8A-8B (see FIG. 10). It can be seen that by following through FIG. 8, the program provides a series of sequential steps to provide for a proper indication of the particular type of character could be an output of Group 8.

It can be seen that the remaining subgroups of a particular group, as depicted in FIGS. 4-6, 7A-7B, 8A-8B, 9A-9B, 10, 11A-11B, 12-15, provide for a decision tree recognition process which enables one or more alphanumeric characters on a document or from a file to be recognized with a minimum number of steps required for accurate recognition.

The algorithm according to the present invention can be utilized with multi-font characters. It can be seen, therefore, that the aspects of the present invention provide an improved optical character recognition apparatus and method using the masks operation incorporating a decision tree process.

What is claimed is:

1. Optical character recognition apparatus comprising:
   (a) means for receiving a document image including image data representative of alphanumeric characters;
   (b) mask matching means for processing said image data to identify said alphanumeric characters, said processing means including:
   means for storing each of said alphanumeric characters in a matrix enclosing said character;
   means for identifying each of said alphanumeric characters including group sorting means for assigning said character to one of a plurality of groups based upon
   a computed height/width ratio of said alphanumeric character,
   positions of segments of said alphanumeric character within said matrix, and
   positions of blank areas of said alphanumeric character in said matrix, each of said groups representing one or more particular types of alphanumeric characters, and subgroup sorting means for selecting a particular alphanumeric character within said assigned group based upon:
   one or more computed height/width ratios of said alphanumeric character,
   positions of segments of said alphanumeric character within said matrix, and positions of blank areas of said alphanumeric character in said matrix.

2. The apparatus as in claim 1 wherein said identifying means performs an average of 3.5 comparisons of characteristics of said alphanumeric character with predetermined criteria to identify said alphanumeric character.

3. The apparatus as in claim 1 wherein said plurality of groups include a total of at least 36 distinct characters.

4. In a character recognition apparatus, a method comprising the steps of:
  (a) receiving a document image including image data representative of alphanumeric characters; and
  (b) analyzing said image data to identify said alphanumeric characters, including the steps of:
    storing each of said alphanumeric characters in a matrix enclosing said character; and
    identifying each of said alphanumeric characters including assigning said character to one of a plurality of groups based upon
      a computed height/width ratio of said alphanumeric character,
      positions of segments of said alphanumeric character within said matrix, and
      positions of blank areas of said alphanumeric character in said matrix, each of said groups representing one or more particular types of alphanumeric characters, and selecting a particular alphanumeric character within said assigned group based upon:
    one or more computed height/width ratios of said alphanumeric character,
    positions of segments of said alphanumeric character within said matrix, and
    positions of blank areas of said alphanumeric character in said matrix.

5. The method as in claim 4 wherein said identifying step includes an average of 3.5 comparisons of characteristics of said alphanumeric character with predetermined criteria to identify said alphanumeric character.

6. The method as in claim 4 wherein said plurality of groups include a total of at least 36 distinct characters.

* * * * *

UNITED STATES PATENT AND TRADEMARK OFFICE
CERTIFICATE OF CORRECTION

PATENT NO. : 5,119,441
DATED : June 2, 1992
INVENTOR(S) : Wayne Wang, et al

It is certified that error appears in the above-indentified patent and that said Letters Patent is hereby corrected as shown below:

The drawing sheets, consisting of Figs. 1, 2, 3, 4, 6, 7A, 7B, 11B, 13, 14 and 15, should be deleted to be replaced with the drawing sheets, consisting of Figs. 1, 2, 3, 4, 6, 7A, 7B, 11B, 13, 14 and 15, as shown on the attached pages.

Signed and Sealed this

Seventh Day of December, 1993

*Attest:*

BRUCE LEHMAN

*Attesting Officer*     *Commissioner of Patents and Trademarks*